United States Patent
Nutz, Jr. et al.

(10) Patent No.: US 6,902,708 B1
(45) Date of Patent: Jun. 7, 2005

(54) METHOD AND APPARATUS FOR MAKING CARBON BLACK

(75) Inventors: Reinhold Nutz, Jr., Rosenhayn, NJ (US); John E. Custer, Turnersville, NJ (US); Jack D. Narbut, Millville, NJ (US)

(73) Assignee: Air Liquide America Corporation, Houston, TX (US)

( * ) Notice: Subject to any disclaimer, the term of this patent is extended or adjusted under 35 U.S.C. 154(b) by 416 days.

(21) Appl. No.: 09/617,168

(22) Filed: Jul. 17, 2000

Related U.S. Application Data (60) Provisional application No. 60/199,554, filed on Apr. 25, 2000.

(51) Int. Cl.$^7$ ........................ C03B 40/027; F23D 14/00; F23N 5/20; C09C 1/48
(52) U.S. Cl. ........................ 422/150; 422/116; 65/169; 65/170; 431/258; 431/278
(58) Field of Search ........................ 422/116, 150–157; 431/258, 278, 8, 238, 239, 242; 423/449.1, 450–452; 65/170, 169, 24, 26; 427/446, 447

(56) References Cited

U.S. PATENT DOCUMENTS

| | | | | |
|---|---|---|---|---|
| 3,092,166 A | * | 6/1963 | Shepherd ........................ | 431/9 |
| 4,264,350 A | | 4/1981 | Thomas ........................ | 65/26 |
| 4,409,010 A | * | 10/1983 | Brown ........................ | 65/26 |
| 4,412,974 A | | 11/1983 | Nicolas et al. ............... | 422/156 |
| 4,418,049 A | * | 11/1983 | Tillman .................... | 423/449.1 |
| 4,526,600 A | | 7/1985 | Myers ........................ | 65/24 |
| 4,604,120 A | * | 8/1986 | Brown ........................ | 65/26 |
| 4,648,893 A | | 3/1987 | Roux ........................ | 65/26 |
| 4,729,779 A | | 3/1988 | De Vasselot et al. ........... | 65/84 |
| 4,741,691 A | | 5/1988 | Messimer .................... | 431/202 |

(Continued)

FOREIGN PATENT DOCUMENTS

| | | |
|---|---|---|
| DE | 4311773 A1 | 10/1994 |
| DE | 4340062 A1 | 11/1995 |
| EP | 01 40 0801 | 11/1980 |
| EP | 0 238 403 | 3/1990 |

OTHER PUBLICATIONS

T. Ployart, Air Liquide Chicago Research Center Combustion Laboratory, Improving ALBLACK Technology, a Technology Used for Lubricating Molds in the Glass Industry, Sep. 1999.

PCT International Search Report.

Primary Examiner—Hien Tran
Assistant Examiner—Jennifer Leung
(74) Attorney, Agent, or Firm—Elwood L. Haynes (57) ABSTRACT

Methods and apparatus are presented for producing carbon black on a substrate. One preferred method includes providing a head assembly including a nozzle, the nozzle including a first injector for injecting a gas such as acetylene, and a second injector for injecting a mixture of a fuel and an oxidant to produce a pilot flame. The head assembly is indexed over a substrate on which is to be deposited carbon black. The acetylene is injected through the first injector, then through a pilot flame emitted from one or more second injectors, and finally toward a substrate to be coated with carbon black, but only when a deposit of carbon black is desired. The method includes ceasing the flow of acetylene, indexing the head assembly away from the substrate on which was just deposited the carbon black after a carbon black deposition sequence, and ceasing fuel gas and oxidant gas flows through the second injector. Just before the next carbon black deposition is required, the fuel and oxidant are initiated and ignited with an ignition source and accompanying automatic electronic ignition, thus recreating the pilot flame(s). Indexing the head assembly toward a surface to be coated with carbon black, and initiating a flow of acetylene when a layer of carbon black is desired, completes a cycle.

32 Claims, 7 Drawing Sheets

U.S. PATENT DOCUMENTS

| | | |
|---|---|---|
| 4,804,324 A | 2/1989 | Yoshinaga .................. 431/255 |
| 4,806,137 A | 2/1989 | Virey ............................. 65/26 |
| 4,879,074 A | 11/1989 | Waku et al. ................... 264/24 |
| RE34,785 E | 11/1994 | Virey ............................. 65/26 |
| 5,679,409 A | 10/1997 | Seeman ...................... 427/446 |
| 5,728,188 A | 3/1998 | Warnecke .................. 65/17.1 |
| 5,746,800 A | 5/1998 | Ambrogio .................... 65/169 |
| 5,893,942 A | 4/1999 | Nickey et al. ................ 65/171 |
| 5,900,035 A | 5/1999 | Hoenig et al. ................ 65/319 |
| 5,917,106 A | 6/1999 | Cirincione et al. ........... 65/122 |
| 5,958,099 A | 9/1999 | Morettin ........................ 65/26 |

\* cited by examiner

METHOD AND APPARATUS FOR MAKING CARBON BLACK

CROSS REFERENCE TO RELATED APPLICATION

This application claims the benefit under 35 U.S.C. §119 (e) to provisional application No. 60/199,554, filed Apr. 25, 2000, the entire contents of which are incorporated herein by reference.

BACKGROUND OF THE INVENTION

1. Brief Description of the Invention

The present invention relates to combustion methods and apparatus, more particularly, those that produce carbon black.

2. Related Art

Previously, it has been known to produce carbon black by use of a flame, through which a highly-carbon-laden gas, such as acetylene, was moved through. The heat of the flame "cracks" the acetylene and forms the carbon black.

Improvements have been made by some, for example, to eliminate the flame, sometimes called a pilot flame. Elimination of the pilot flame does eliminate two gases, fuel (typically natural gas) and oxidant (typically air or oxygen) for the pilot flame. Normally what is done is that an ignition source is placed near the acetylene flow. When a carbon black deposit is desired, an ignition source is activated, lighting off the acetylene.

This approach has its own drawbacks however, the main one being that the ignition source is exposed to the source of carbon black. The carbon black can and does tend to cloak the ignition source in carbon black.

What is desired then, is a method and apparatus which eliminates or greatly reduces the amount of carbon black deposited on ignition sources, but which maintains the benefits of the pilot flame.

SUMMARY OF THE INVENTION

In accordance with the present invention, methods and apparatus are presented which greatly reduce, or even eliminate, the above problems of carbon black deposited on the ignition source, while maintaining the benefits of a pilot flame.

In a first aspect of the invention, an apparatus is presented, the apparatus comprising a nozzle including a first-injector for injecting a highly-carbon-laden gas. The nozzle includes at least one second injector for injecting a mixture of a fuel and an oxidant for a pilot flame, the nozzle secured in a moveable head assembly. The head assembly comprises a main gas block and an ignition source mounted in a plenum which encloses respective tips of the first and second injectors. The highly-carbon-laden gas and the fuel and oxidant mixture exit through these tips and enter and fill the gas plenum, as further described herein.

As used herein, the term "highly-carbon-laden gas" means a gas as previously defined in U.S. Re. Pat. No. 34,785: a gaseous hydrocarbon or mixture of gaseous hydrocarbons comprising at least 15% of a constituent in respect of which the ratio of the number of carbon atoms to the number of hydrogen atoms C/H is greater than 0.75.

In the second aspect of the invention, methods are presented for producing carbon black on a substrate. One preferred method includes the steps comprising providing a head assembly including a nozzle, the nozzle including a first injector for injecting a highly-carbon-laden gas, and a second injector for injecting a mixture of a fuel and an oxidant to produce a pilot flame; indexing a head assembly ("indexing" is a term of art meaning precisely positioning) over a substrate on which is to be deposited carbon black, flowing the highly-carbon-laden gas through the first injector, then through a pilot flame emitted from the second injector (preferably there exists more than one second injector), and finally toward a substrate to be coated with carbon black, but only when a deposit of carbon black is desired. The method further comprises ceasing the flow of highly-carbon-laden gas, indexing the nozzle away from the substrate on which was just deposited the carbon black after a carbon black deposition sequence, and ceasing fuel gas and oxidant gas flows through the second injector. Purge gas (nitrogen, for example) is used to keep the first and/or second injectors clean, and to help cool each nozzle. Just before the next carbon black deposition is required, the method comprises initiating the fuel and oxidant preferably through a deflector jet as described herein, and igniting both with an ignition source, thus recreating the pilot flame(s). Indexing the head assembly toward a surface to be coated with carbon black, and initiating a flow of highly-carbon-laden gas when a layer of carbon black is desired, completes a cycle.

Contrary to previous apparatus and methods known in the art, the ignition source and timing sequence allow reduced operating cost on production runs where carbon deposition is required infrequently. This is performed by an ignition system that will activate the pilot flame at least one cycle before the firing cycle, and deactivate the flame immediately following the scheduled application of carbon black.

Another aspect of the invention is that the nozzle is preferably removable, more preferably by simply using a wrench or simple tool to loosen a nut securing the nozzle to the head assembly. This feature allows for ease of replacement of individual nozzles. As used herein, the word "nozzle" means one or more components of a head assembly which directs the highly-carbon-laden gas, and oxidant and fuel, into a plenum, as is further described herein. This "removable" (preferably quick change) nozzle feature enables an operator to quickly change out dirty or damaged nozzles, preferably in less than 60 seconds, while the head assembly remains otherwise undisturbed, indexed in position, for example on an IS glass molding machine. In a preferred embodiment, the nozzle comprises:

a) a substantially hollow, substantially cylindrical body having a gas exit end and a connection end, the gas exit end having an end cap having a central orifice and at least one non-central orifice, the central orifice having positioned therein a hollow tube having it first end extending into the central orifice and a second end extending into the substantially hollow, substantially cylindrical body, the second end of the hollow tube being supported by and extending through a support plate positioned in an interior location of the substantially hollow, substantially cylindrical body, the connection end of the substantially hollow, substantially cylindrical body adapted to be mated with a sealing member when the nozzle is installed for use;

b) the support plate positioned to divide the interior of the substantially hollow, substantially cylindrical body into a first chamber and a second chamber, the first chamber defined by the support plate, end cap, and a first interior surface of the substantially hollow, substantially cylindrical body, the second chamber defined by the support plate, sealing member, and a second interior surface of the substantially hollow, substantially cylindrical body;

c) the substantially hollow, substantially cylindrical body having at least one orifice extending from an exterior surface of the body to the first chamber, and at least one orifice extending from the exterior surface of the body to the second chamber.

Another aspect of the invention is a removable, preferably quick change head assembly. As used herein, the term "head assembly" means an assembly which includes a main gas block having means for securing one or more nozzles, and having internal channels or conduits for flow of fuel, oxidant, and highly-carbon-laden gas. There is also preferably a conduit or channel in the main gas block for a purge gas such as nitrogen or air. Each head assembly is equipped with at least two gas supply connections: one for highly-carbon-laden gas, and one for mixture of fuel and oxidant for a pilot flame. Preferably, the head assembly has a third gas supply connection for purge gas. (Variations may be made by those skilled in the art; for example, four gas connections (one for fuel, one for oxidant, one for highly-carbon-laden gas, and one for purge gas) may increase complexity, but this is compensated by increased safety.) The gas supply connections are preferably connected to gas supply conduits (preferably stainless steel braided TEFLON® or metal conduits) which are connected in turn to a gas distribution block, which is plumbed preferably in close proximity to the head assembly. Each gas distribution block is preferably equipped with quick disconnects, preferably color-coded, which connect to the gas supply conduits. Each disconnect is preferably color-coded to prohibit incorrect recoupling of the respective gas conduits. The quick disconnects require no tools to couple and uncouple the gas supply conduits, Preferably, head assemblies of the invention are attached to an inventive funnel arm shaft clamp block by way of a single lock nut, which slides easily in and out of a T-slot. The single lock nut design provides for a complete head assembly change over in minutes, and the T-slot mounting ensures fast, dependable realignment.

Another aspect of the invention is a head assembly mounting plate which mates on one of its main surfaces with the T-slot of the inventive funnel arm shaft clamp block, and on its other main surface with a main gas block. The inventive head assembly mounting plate comprises a T-shaped tongue portion that serves to position the head assembly on the funnel arm shaft clamp block of the IS machine. By off-setting bolt holes from a center line of the mounting plate, this apparatus can achieve a wider range of vertical adjustment by simply rotating the plate 180° and reattaching it to the head assembly. In many cases, this will allow customer job changes from a short blank to a large blank without the need to reposition customer's funnel arm shaft clamp block which sets critical alignment.

A still further aspect of the invention is a funnel arm shaft clamp block with height adjustment. This feature comprises a funnel arm shaft clamp block which cooperates with, but is independent of the inventive head assembly. When properly positioned, the inventive funnel arm shaft clamp, block will remain with the funnel arm shaft, when, for example, a head assembly change is desired. With the inventive funnel arm shaft clamp block left undisturbed, the head assembly can be changed out in minutes and a new head assembly will be properly positioned or "indexed" simply by securing the single quick change nut. Funnel arm shaft clamp blocks of the invention allows for simple height adjustments or the complete replacement of a head assembly without the loss of critical nozzle to mold blank alignment, important for many reasons in I.S. machines.

A further aspect of the invention includes a pre- and post-purge system, for when the highly-carbon-laden gas is processed to produce carbon black. When the acetylene or other highly-carbon-laden gas is on and flowing, it is passed through an oxy-fuel flame or air-fuel flame, which is commonly known as a pilot flame. Preferably to ensure system safety and minimize the deposition of carbon black on the outlet face of an injector, nitrogen or some other gas (even air) is preferably used to purge the acetylene conduit and pilot gas conduits through the injector conduits, preferably before and after each carbon black deposition cycle.

Another aspect of the invention is an automatic ignition system. This system comprises electronics and a spark source that will activate the pilot flame(s), preferably at least one cycle before the firing cycle, and deactivate the pilot flame(s) at a predetermined time, preferably immediately, following the scheduled application of carbon black. This greatly reduces operating costs on production runs where carbon deposition is required infrequently.

A further aspect of the invention is a shield surrounding the tips of the one or more nozzles and their associated injectors, in a fashion which has multiple functions, one of which is to serve as a flash shield to minimize visible flash to the operator. The cracking of acetylene and other highly-carbon-laden gases emits a very bright yellow-white flash of light as the acetylene is fired through the pilot flame. The inventive shield minimizes this visible flash. This device also serves to insulate the pilot flames from the occasional blow out due to the intense air drafts sometimes generated by cooling air used on typical IS machines. Yet another function of this inventive shield is to serve as four sides of a plenum which is completed when the head assembly is indexed away from the mold blanks and put in a resting position. The inventive shield moves over and aligns with a shelf plate and thus forms an enclosure or plenum which forms an ignition chamber for the inventive ignition system. When it is desired to light the pilot flames, pilot fuel and oxidant flow are initiated by the inventive automatic ignition system to fill the plenum. After a short time the ignition system ignites a spark source and the gases in the plenum are ignited, in turn igniting the pilot gases emanating from one or more injectors in the head assembly.

A final feature of the invention is a blow and blow delivery arm. On standard IS machines, there are two basic processes: "press and blow" which does not use a funnel to guide the gob into the mold blank, and: "blow and blow" which does require the use of a funnel. In the known "press and blow" process, systems known under the trade designation "ALBLACK™", available from L'Air Liquide SA, Paris, France, and Air Liquide America Corporation, Houston, Tex., take advantage of an available funnel arm shaft to mount the hardware for the production of carbon black when needed. On "blow and blow" processes, however, a more sophisticated retractable delivery system was designed in accordance with the present invention to work with a working funnel, and yet still mount on the same shaft. This was accomplished in the present invention by using the same universal funnel arm shaft clamp block, but incorporating an air activated latching device to engage the burner head assembly as required and a release that will allow it to retract so as not to interfere with the gob drop. The system of the invention incorporates all of the same features as the "press and blow" system including the quick change capabilities.

Further advantages of the main features of the invention will become apparent upon reading the Brief Description of Drawings and Description of Preferred Embodiments which follow.

DESCRIPTION OF PREFERRED EMBODIMENTS

Note that while the drawings are deemed to be representative of preferred embodiments, they are not necessarily to scale.

Figure 1:
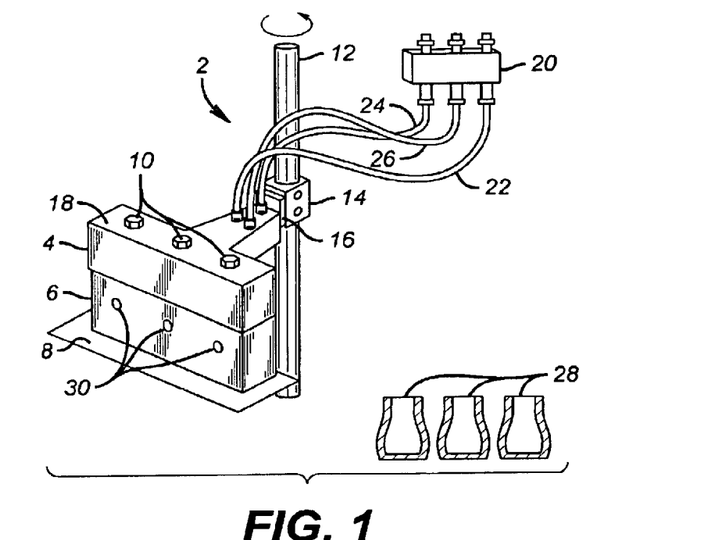
FIG. 1 is a perspective view of a 3 gob head assembly in accordance with the present invention, showing the position of the head assembly when carbon black deposition is not required.
Figure 2:
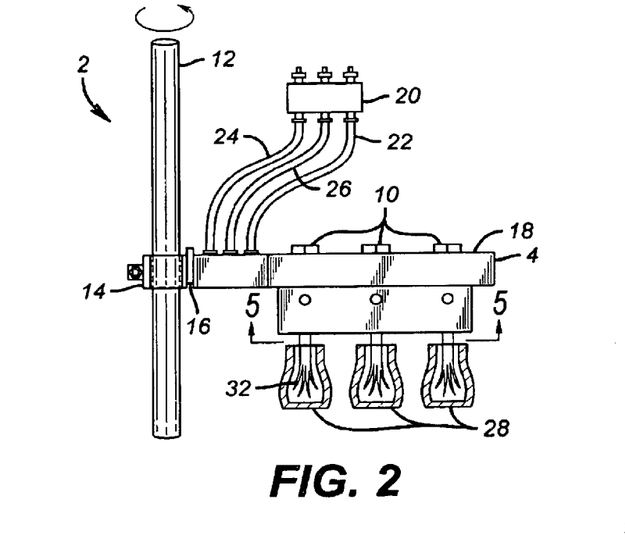
FIG. 2 is a perspective view as in FIG. 1, showing a 3 gob head assembly of the invention when carbon black deposition is required.
Figure 3:
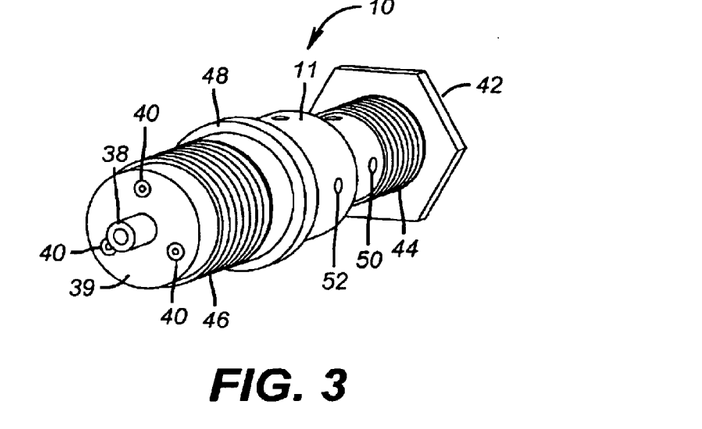
FIG. 3 is a perspective view of a nozzle and associated injectors in accordance with the present invention.

FIGS. 1 and 2 illustrate the primary features of the present invention. Illustrated in FIG. 1 is an apparatus of the invention 2 which includes a head assembly 4, having a shield 6 attached to the bottom thereof. Shield 6 is preferably a hollow, four sided rectangle (although other shapes, such as cylindrical may be employed), which may be made of sheet metal or other type of rigid, noncombustible material. Also illustrated is a shelf plate 8 which is positioned underneath the shield 6 and which may or may not touch the bottom edge of shield 6. Shelf plate 8 and shield 6, along with a lower surface of head assembly 4, essentially create a plenum or gas box, as will be explained later herein. Further illustrated in FIG. 1 are three identical nozzles indicated at 10 (where FIG. 1 illustrates only a top portion of the nozzles). A perspective view of a nozzle is indicated in FIG. 3. Nozzles 10 extend from a top surface of a main gas block 18, down through said main gas block 18 vertically, as will become more apparent herein. Also included in the apparatus 2 of FIG. 1 is a gas distribution block 20, and gas hoses 22, 24, and 26. For example, gas hose 22 may be a purged gas hose, wherein a purge gas such as nitrogen or even air may be used. Gas hose 24 will typically carry a mixture of fuel gas and oxidant, such as a mixture of natural gas and oxygen, while gas hose 26 carries a highly-carbon-laden gas such as acetylene, propylene-acetylene mixture, and the like. Main gas block 18 is attached to a funnel arm shaft 12 via a funnel arm shaft clamp block 14 and a head assembly mounting plate 16.

Completing FIGS. 1 and 2 are molds 28, which as is well known in the art would receive a molten gob of glass. Also depicted in FIG. 1 on the shield 6 are holes 30 which may be termed cooling vents, although they have multiple purposes as further explained herein.

FIG. 1 represents the position of the apparatus when carbon black is not being deposited in molds 28, whereas FIG. 2 indicates a position of the apparatus wherein carbon black is being deposited in molds 28, as depicted by flames 32. Flames 32 from the highly-carbon laden gas are typically only flowing for a short period of time (usually a matter of seconds or less). In order to move from the position of FIG. 1 to the position of FIG. 2, the main gas block 18, head assembly mounting plate 16 and funnel arm shaft clamp block 14 are pivoted or indexed about the funnel arm shaft 12 in order to move the main gas block 18 and head assembly 4, with its corresponding shield 6, over the molds. The indexing of the apparatus back and forth between the positions of FIGS. 1 and 2 are preferably performed by automatic controls associated with an IS machine, which is not shown in the figures and is not a part of the invention. Flames 32 are fired in an automatic ignition system of the invention as further explained herein.

As previously mentioned, FIG. 3 illustrates in perspective one embodiment of a nozzle 10 in accordance with the present invention. Nozzle 10 comprises a metallic body 11 preferably composed of steel, although other metals such as brass will function effectively. Nozzle 10 includes a central or first injector 38 which protrudes preferably a certain distance away from a hot face 39 of nozzle body 11. The distance of protrusion of ejector 38 away from hot face 39 depends on conditions of firing, the gases used for the highly-carbon laden gas, the number of firings and a number of other parameters. The distance may range from 0 (i.e. flush) to 5 cm, more preferably from about 1 cm to 5 cm. First injector 38 extends inward into nozzle body 11 about half of the length of nozzle body 11, which allows flow of highly-carbon-laden gas flowing through main gas block 18 to traverse through a hole 52 and then exit first injector 38 at its tip. First injector 38 is essentially a metal tube, preferably steel, which fits snugly in a centrally drilled or machined through hole in nozzle 10 body. Also illustrated are three second injectors 40 which are preferably equidistantly placed about the centrally located first injector 38. Second injectors 40 are the so-called pilot flame injectors, where a mixture of a fuel gas and an oxidant, preferably natural gas or methane and oxygen are flowed through and ignited to form a hot flame through which the highly carbon-laden gas will flow. Second injectors 40 are preferably metallic tubes fitting snugly into respective through holes in nozzle body 11, extending roughly one third of the length of nozzle body 11. Second injectors receive a feed of fuel and oxidant mixture through a hole (not shown in FIG. 3, but just behind flange 48)) in nozzle body 11.

Figure 16:
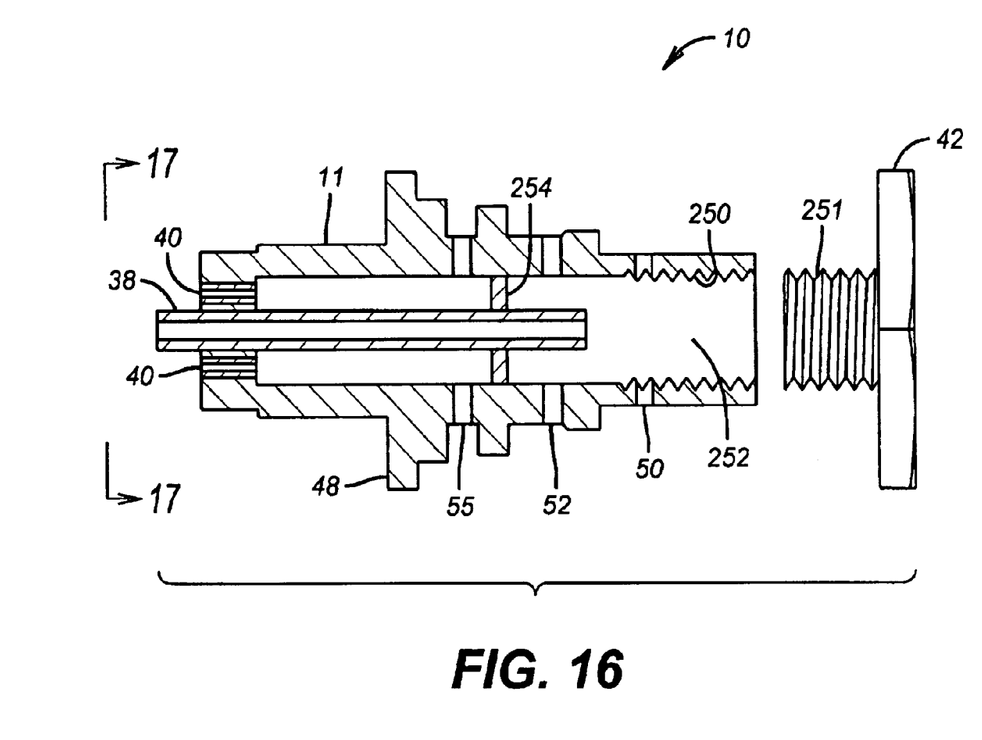
FIGS. 16 and 17 are cross-sectional and end elevation views, respectively, of a nozzle in accordance with the invention.
Figure 17:
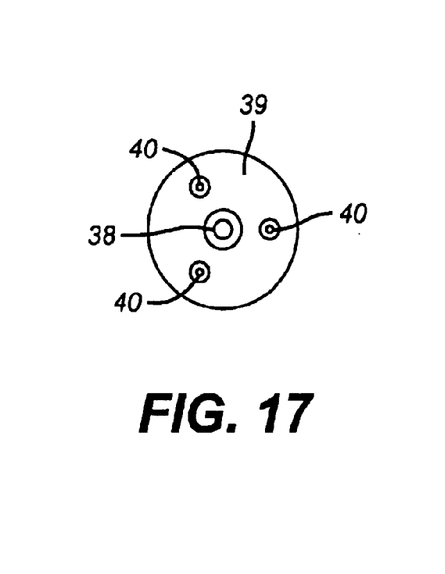

Referring to FIGS. 16 and 17, nozzle 10 includes a quick change bolt 42, which has a male portion 251 having threads and adapted to extend into a cavity 252 in nozzle body 11. Cavity 252 has internal female threading 250 that mate threads on male portion 251. Bolt 42 preferably has metallurgy same or similar as nozzle body 11. Bolt 42 is inserted into the top of main gas block 18 and engages nozzle body 11, which is inserted from an underside of main gas block 18, through shield 6. A flange 48 is included in the nozzle 10 which serves to seal the previously described plenum formed by shield 6 and shelf plate 8. Also indicated in FIG. 16 are holes 50, 52, and 55, hole 50 being an inlet for purge gas, such as nitrogen or air, hole 52 allows a flow of acetylene or other highly carbon-laden gas to first injector 38, and hole 55 allowing a flow of fuel/oxidant mixture to second injectors 40. Also illustrated in FIG. 16 is the extension of first injector 38 into the nozzle body 11 and through a support plate 254, which seals off the fuel/oxidant mixture from the acetylene. FIG. 17 illustrates the hot face 39, first injector 38, and second injectors 40 (three in this embodiment). At least one second injector must be present, while more than three are possible, although adding to cost and complexity.

When assembling a nozzle 10 into a main gas block 18, o-ring gaskets are used. This use of o-rings is a standard technique and requires no further explanation to the skilled artisan. The rubber material known under the trade designation VITON™ is a preferred o-ring material.

Figure 4:
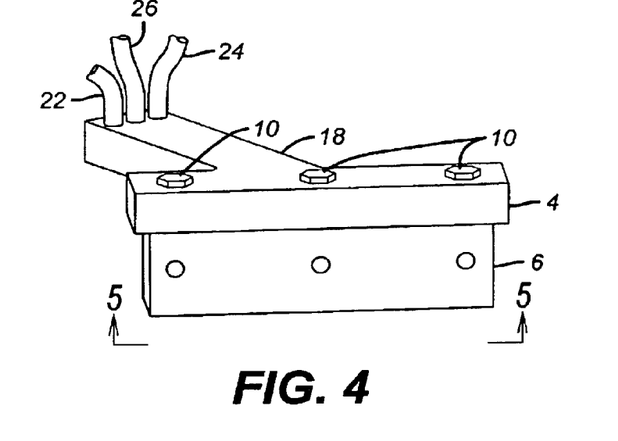
FIG. 4 is another perspective view of a 3 gob head assembly in accordance with the invention.

FIG. 4 illustrates in perspective view a head assembly 4 in accordance with the present invention, again illustrating a shield 6 and three nozzles 10.

Figure 5:
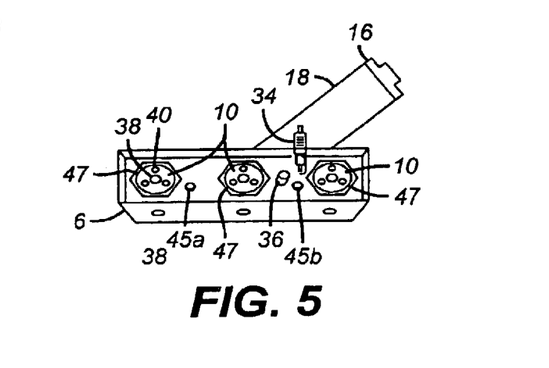
FIG. 5 is a reverse plan view of a head assembly of the present invention, showing an ignition source installed.

FIG. 5 is a reverse plan view, looking from an underside of the shield 6 of the apparatus of FIG. 4. Three nozzles 10 may be clearly seen protruding from main gas block 18 and into the interior space of shield 6, through three respective holes 47 in shield 6. Shield 6 is secured to main gas body 18 via bolts 45a and 45b.

The reverse plan view of FIG. 5 is convenient for illustrating an igniter means 34, shown here as a common spark plug, which protrudes through one side of shield 6, the hot end of spark plug 34 protruding into the interior space of the shield 6. For the igniter to work, several problems had to be solved.

1) The igniter had to be isolated from the extreme temperatures generated by the pilot flames.

2) Minimize carbon deposition on the electrode and ground of the igniter.

3) Overcome the physics of high velocity gas/oxygen pilot flame during ignition. These objectives were substantially obtained by providing one or more deflector jets 36, which are installed at strategic points between burner nozzles. Deflector jet 36 is tapped into the conduit that supplies gas/oxygen mixture to the pilot flames. These deflector jets serve to divert and retard the rate of a small sample of gas/oxygen flow and present the small sample to the igniter at a rate where the igniter would be effective, but not in direct line with the pilot flames. Igniter 34 is connected to electronics (not illustrated) which allow automatic firing of the igniter 34 in a sequence to be described herein. For the moment, it is important to point out that igniter 34 serves to ignite combustible gases which fill the interior space or plenum within shield 6 at an appropriate time to light the pilot flames emanating from second injectors 40. This is critical in that gases which comprise the pilot flames may be shut off when not needed, and reinitiated when needed. Without shield 6 and accompanying shelf plate 8 as previously described, as well as deflector jet 36, reignition of the pilot flames would be difficult, if not impossible, given the heavy air drafts in a typical glass manufacturing plant. Furthermore, the pilot flames may be lit usually in one or two ignitions of igniter 34. Ignition may be verified by viewing the pilot flames through the holes 30.

Figure 6A:
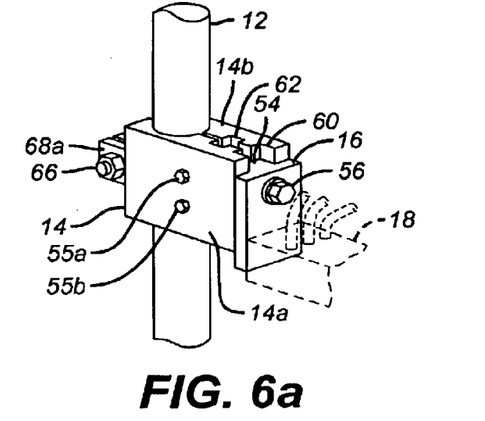
FIGS. 6a and 6b are perspective views, with some components in phantom, of a head assembly mounting plate in accordance with the present invention.
Figure 6B:
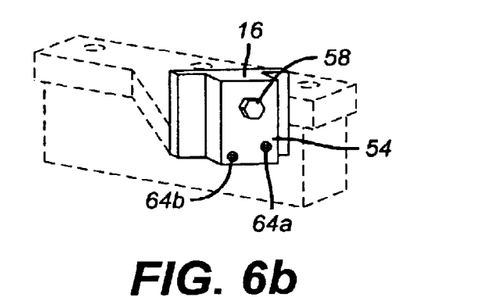

Turning now to FIGS. 6a and 6b, FIG. 6a is a perspective view funnel arm shaft clamp block 14 and its accompanying head assembly mounting plate 16 in accordance with the present invention. Main gas block 18 and gas hoses are shown in phantom in FIG. 6a for clarification. Head assembly mounting plate 16 includes a tongue 54 which protrudes into a T-slot 60. Also depicted are a mounting nut 56 for attaching and tightening head assembly mounting plate 16 to the funnel arm shaft clamp block 14. Mounting nut 56 operates with an engaging nut 58 as is illustrated in FIG. 6b, wherein nut 56 is tightened to firmly attach mounting plate 16 to clamp block 14. Also illustrated in FIG. 6a is a rectangular slot 62 which receives engaging nut 58 as illustrated in FIG. 6b.

Figure 7:
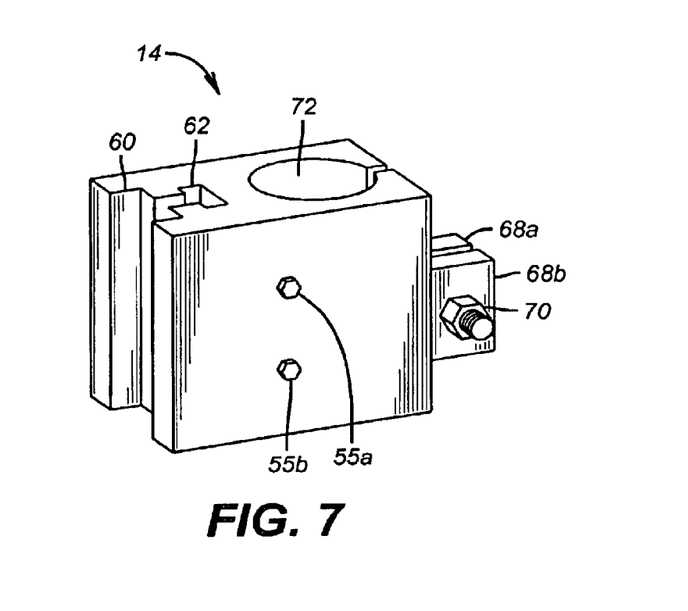
FIG. 7 is a perspective view of a funnel arm shaft clamp block with height adjustment in accordance with the present invention.

Shaft clamp block 14 essentially comprises two halves 14a and 14b which are primarily secured together using a pair of bolts 55a and 55b which traverse through both block halves 14a and 14b. Shaft clamp block 14 is allowed to pivot around shaft 12 by loosening matching clamp block clamp halves 68a and 68b via a clamp block bolt 66. As may be seen in the perspective view in FIG. 7 of the clamp block and its assembly, clamp block clamp halves 68a and 68b are secured using a clamp block nut 70 which engages clamp block bolt 66 in order to tighten the clamp block onto shaft 12. Clamp block 14 is preferably only so tight on shaft 12 to support the main gas block 18, but allowing for indexing or movement as depicted in FIGS. 1 and 2. A shaft block hole 72 is depicted in FIG. 7, the hole 72 accommodating shaft 12.

Figure 9:
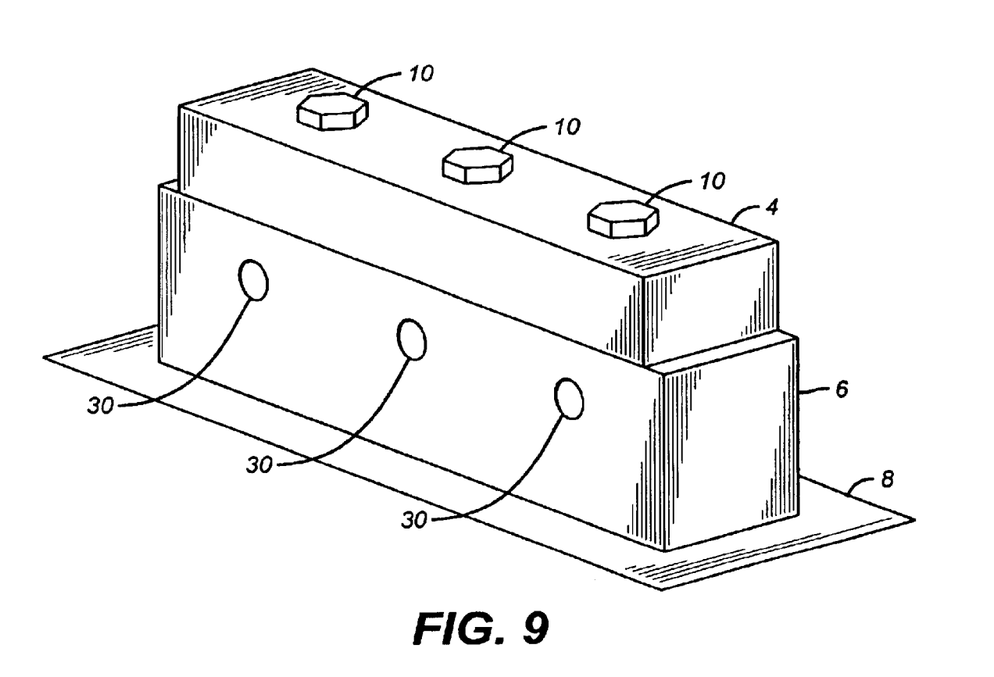
FIG. 9 is a perspective view of a shield and a shelf in accordance with the invention, forming part of a gas plenum.

FIG. 9 is a further perspective view of a triple gob set up, again showing nozzles 10, head assembly 4 and shield 6 in association with a shelf plate 8. Once again, the function of shield 6 and shelf plate 8 primarily is to create a plenum for combustible gases so that the pilot flames may be easily lit by igniter 34 (not shown in FIG. 9). The shield also has a secondary function which is to shield an operator's eyes from the bright yellow flame of acetylene when the acetylene is fired for carbon black deposition. Cooling vents 30 are shown circular, but of course, could be rectangular or even slits without departing from the scope of the invention. Shield 6 and shelf plate, while preferably being sheet metal, which is steel material, could conceivably be any non-combustible heat resistant material, such as asbestos or other flame retardant material.

Figure 10:
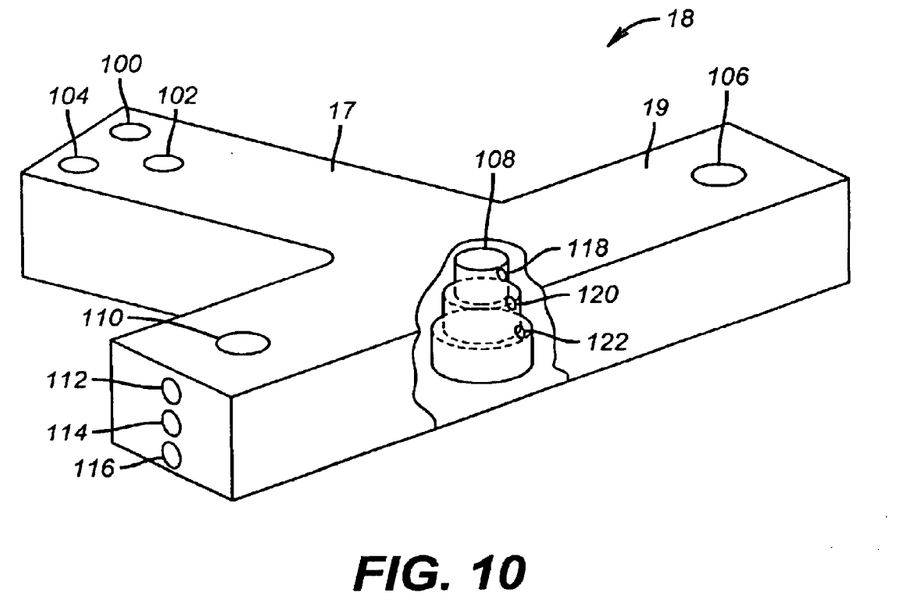
FIGS. 10 and 11 are perspective views, with parts cut away, of one embodiment of a main gas block in accordance with the present invention.
Figure 11:
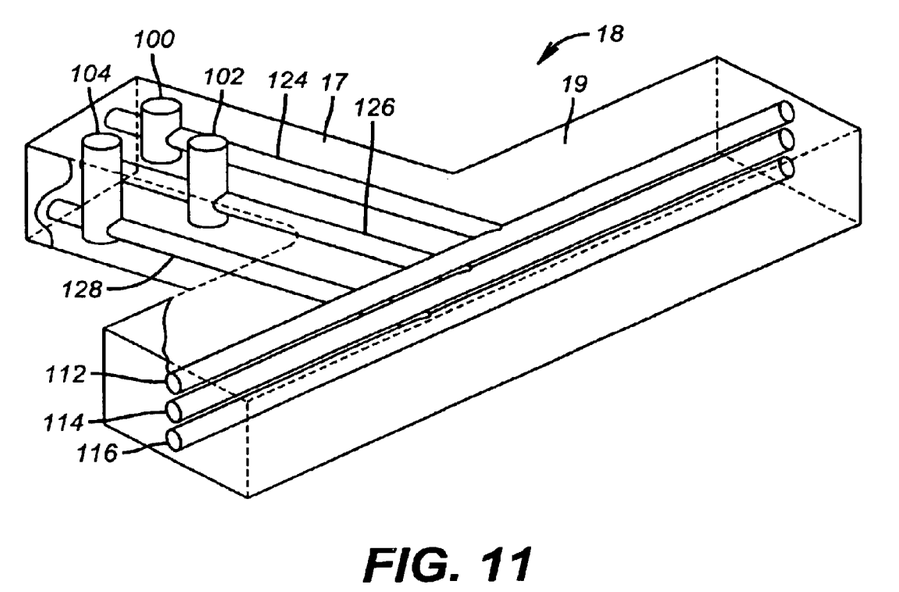
Figure 12:
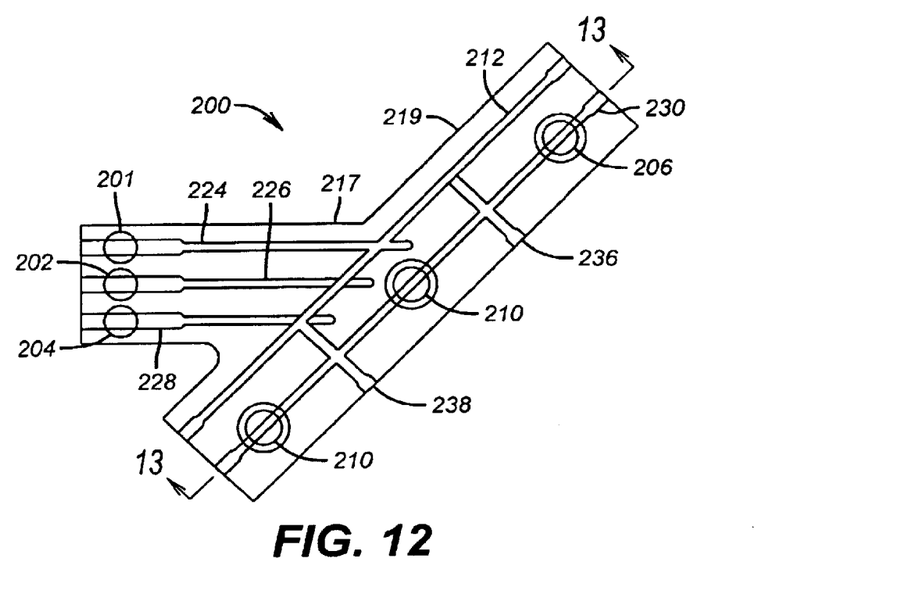
FIGS. 12, 13, and 14 are plan, side elevation, and end elevation views, respectively, with some parts in phantom, of a main gas block in accordance with the invention.
Figure 13:
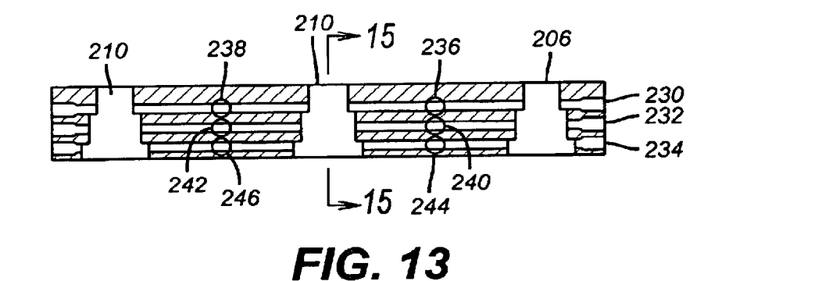
Figure 14:
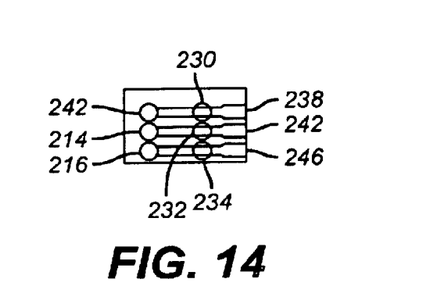
Figure 15:
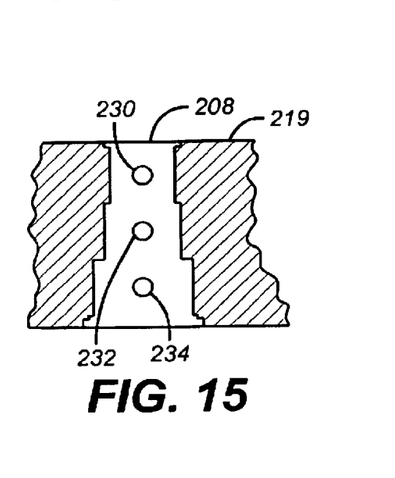
FIG. 15 is a side elevation view of an embodiment of a hole machined in the main gas block of FIGS. 12, 13, and 14.

FIGS. 10 and 11 illustrate in perspective view a main gas block 18 having three through holes 106, 108, and 110, in a header portion 19. Holes 106, 108, and 110 are drilled or machined for accepting three respective nozzles, not shown for clarity. A support section of main gas block 18 includes in this embodiment three drilled or machined vertical conduits 100, 102, and 104. Conduits 100, 102, and 104 preferably do not traverse the entire thickness of support section 17, although they may be drilled all the way through section 17, then capped with an appropriate screw or other fitting. A third set of drilled or machined conduits 112, 114, and 116 are depicted, travelling length-wise, in roughly horizontal attitude. Conduits 112, 114, and 116 intersect with conduits 124, 126, and 128, which also traverse roughly main gas block 18 in roughly horizontal manner.

Nitrogen, or other purge gas, will preferably flow (when called for) through conduits 100, 124 and 112. Acetylene, or other highly-carbon-laden gas will flow when called for through conduits 102, 126, then 114. Finally, oxidant-fuel mixture is adapted to flow through conduits 104, 128, and 116 when called for.

In FIG. 10, one can see in perspective an illustration of a set of machined or drilled surfaces associated with conduit 108. Hole 118 accepts purge gas from conduit 112; hole 120 accepts acetylene from conduit 114; and hole 122 accepts mixture of fuel and oxidant form conduit 116. Holes 118, 120, and 122 are orifices sized accordance with the desired flow rates and pressures of the gases flowing there through. Each of holes 110 and 106 will have orifices for accepting flow of gases in similar fashion, and will be sized accordingly. It is important that the orifices are matched so that one nozzle receives more or less the same amount of pilot gases, for example, as the other nozzles, in instances where there is more than one nozzle. Of course, the apparatus of the invention is not limited to three gob systems. One gob, two gob, three gob, and four gob systems are quite common; however there is no reason one could not have more than four nozzles, as the principles of the invention are equally applicable.

FIGS. 12–15 illustrate features of another embodiment of a main gas block 200 of the invention. Referring first to the plan view of FIG. 12, holes 206, 208, and 210 are provided to accommodate respective nozzles (not shown). Conduits 201, 202, and 204 allow flows of purge gas, highly-carbon laden gas, and fuel/oxidant mixture, respectively, to enter main gas block 200. These gases then proceed through conduits 224, 226 and 228, respectively, through support portion 217. Conduit 224 is preferably position in support portion 217 to intersect with conduit 212; conduit 226 is position to intersect with conduit 214; and conduit 228 is positioned to intersect with conduit 216. Purge gas may then traverse from the conduit 212 to conduits 236 and 238, through conduit 230, and into nozzle(s) 10 through respective orifice 50 (see FIG. 16). Highly-carbon-laden gas may traverse conduit 236 to conduit 214, proceed through conduits 240 and 242 (FIG. 13), and through conduit 232 and into nozzle(s) 10 through respective orifice 52. Mixture of fuel and oxidant proceeds through conduit 228, through conduit 216, 244, 246 and 234, and finally into respective orifice 55 in nozzle(s) 10.

Figure 8:
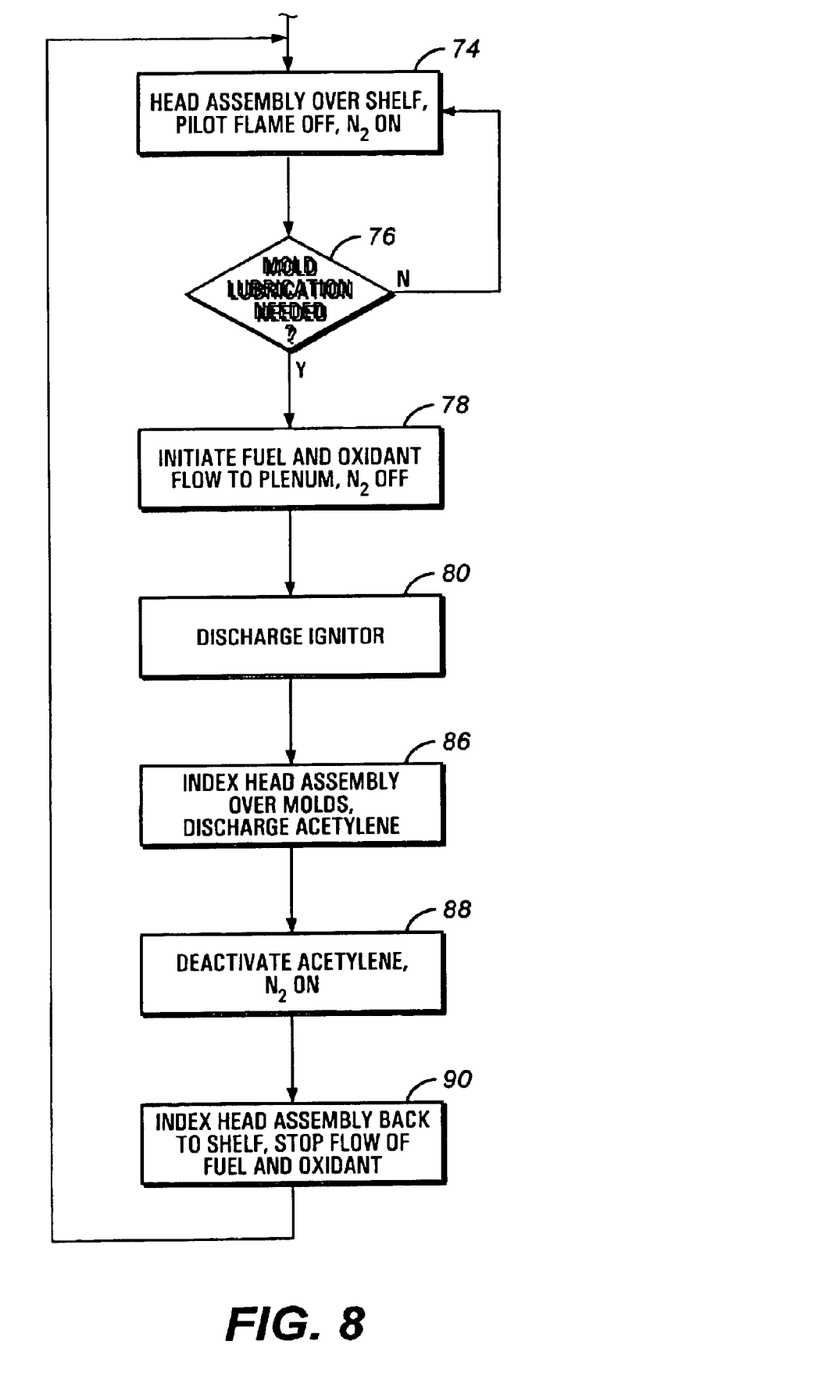
FIG. 8 is a logic diagram of an automatic ignition system in accordance with the present invention.

FIG. 8 is a logic diagram of an automatic ignition sequence in accordance with the present invention. When the automatic ignition system is engaged, typically the head assembly is over shelf plate 8 with the pilot flames off and nitrogen flow on as indicated at 74. The electronic controls of the IS machine, which are not part of the invention, then ask at some point during the glass molding process if a mold lubrication is needed, which is indicated at 76. If the answer is yes, the sequence proceeds to initiate fuel and oxidant flow to the plenum. This is indicated at 78 in FIG. 8. A short time later, usually a matter of seconds, the igniter 34 is discharged as indicated at 80 and the acetylene is discharged, depositing a layer of carbon black on the internals of the molds as indicated in FIG. 2. In a matter of seconds or less, the acetylene is deactivated and the nitrogen flow resumed, as indicated at 88, the head assembly is indexed back over the shelf plate 8, and the flow of fuel and oxidant is ceased, as indicated in the box 90. Logic sequence then reverts back to the first step 74.

This unique and inventive automatic ignition system was devised after it was noticed that in some glass molding operations, the molds need not be lubricated for every glass gob dropped into the mold; indeed, it was determined that in some cases up to 50 glass gobs could be dropped into molds 28 before the molds needed to be relubricated with carbon black. Reduced need to lubricate the molds has advantages, but also presents a challenge in how to conserve fuel and oxidant for the pilot flames. Fuel and oxidant can only be conserved if their flow is minimized or turned off, and then when needed, they can be reinitiated and the pilot flames ignited in a manner providing the operator with a certain degree of confidence that this will occur without fail. Failure of the pilots to light would be very disadvantageous because of the need to deposit carbon black into the molds, which must not fail. If the carbon black is not deposited, the blank molds could be damaged which would cause a shut down of at least a section of the IS machine for replacement of the molds.

The above description of preferred embodiments is meant to be exemplary only and is not exhaustive of all variations which may be apparent to those of skill in the art, which are considered within the scope of the invention and the appended claims. For example, another embodiment may be employed if excessive carbon is built-up on the igniter (this has not been the case to date). A reduced purge gas flow through a "cooling collar" can be employed that shields the electrode and ground area of the spark plug or other igniter with a controlled blast of purge gas while the acetylene is firing.

What is claimed is:

1. An apparatus comprising at least a first and a second burner nozzle, the burner nozzles including a first injector for injecting a highly-carbon-laden gas, the burner nozzles including at least one second injector for injecting a mixture of a fuel and an oxidant for a pilot flame, the burner nozzles secured in a moveable head assembly, the head assembly comprising a main gas block and an ignition source mounted in a gas plenum which encloses respective tips of the first and second injectors, the highly-carbon-laden gas and the fuel and oxidant mixture adapted to exit through these tips and enter and fill the gas plenum, and one or more deflector jets installed at points substantially between the first and second burner nozzles, the deflector jet adapted to direct a portion of said mixture of fuel gas and oxidant toward the ignition source.

2. Apparatus in accordance with claim 1 wherein the burner nozzles are adapted to be quickly removed and replaced by identical burner nozzles.

3. Apparatus in accordance with claim 1 wherein the burner nozzles are adapted to be quickly removed and replaced by a non-identical burner nozzles.

4. Apparatus in accordance with claim 1 wherein the head assembly is removeably secured to a funnel arm shaft block.

5. Apparatus in accordance with claim 4 wherein the head assembly is equipped with at least two gas supply connections, one for highly-carbon-laden gas, and one for mixture of fuel and oxidant for the pilot flame.

6. Apparatus in accordance with claim 5 wherein the head assembly is equipped with a third gas supply connection for purge gas.

7. Apparatus in accordance with claim 5 wherein the gas supply connections are connected to gas supply conduits which are connected in turn to a gas distribution block or gas panel, which is plumbed in close proximity to the head assembly.

8. Apparatus in accordance with claim 7 wherein the gas distribution block is equipped with color-coded connectors which can be joined or disconnected with a simple movement, which connect to the gas supply conduits.

9. Apparatus in accordance with claim 1 wherein the head assembly is connected to a head assembly mounting plate.

10. Apparatus in accordance with claim 9 wherein the head assembly mounting plate is connected to a clamp block.

11. Apparatus in accordance with claim 9 wherein the head assembly mounting plate comprises a T-tongued plate.

12. Apparatus in accordance with claim 10 wherein the clamp block comprises two halves which are secured together using matching clamp block clamp halves using a clamp block bolt and a clamp block nut which engages the clamp block bolt in order to tighten the clamp block onto a shaft, the shaft positioned in a shaft clamp block hole.

13. Apparatus in accordance with claim 1 wherein the main gas block comprises conduits for injection of purge gas to purge said first injector, said second injector, or both said first and said second injectors.

14. Apparatus in accordance with claim 1 wherein the ignition source is further comprised of an automatic ignition system, the automatic ignition system comprising a spark producing means inserted in said gas plenum, an electronic controller for allowing electronic controls of an IS machine to control the spark producing means, and logic software capable of interacting with the electronic controls of the IS machine.

15. Apparatus in accordance with claim 1 wherein said gas plenum is formed by a shield and shelf combination.

16. Apparatus in accordance with claim 1 wherein said burner nozzles are further comprised of:
   a) a substantially hollow, substantially cylindrical body having a gas exit end and a connection end, the gas exit end having an end cap having a central orifice and at least one non-central orifice, the central orifice having positioned therein said first injector, wherein said first injector is further comprised of a hollow tube having its first end extending into the central orifice and a second end extending into the substantially hollow, substantially cylindrical body, the second end of the hollow tube being supported by and extending through a support plate positioned in an interior location of the substantially hollow, substantially cylindrical body, the connection end of the substantially hollow, substantially cylindrical body adapted to be mated with a sealing member when the burner nozzle is installed for use;
   b) the support plate positioned to divide the interior of the substantially hollow, substantially cylindrical body into a first chamber and a second chamber, the first chamber defined by the support plate, end cap, and a first interior surface of the substantially hollow, substantially cylindrical body, the second chamber defined by the support plate, sealing member, and a second interior surface of the substantially hollow, substantially cylindrical body;
   c) the substantially hollow, substantially cylindrical body having at least one orifice extending from an exterior surface of the body to the first chamber, and at least one orifice extending from the exterior surface of the body to the second chamber.

17. Apparatus in accordance with claim 16 wherein the sealing member is a threaded bolt having male threads adapted to mate with female threads on the second interior surface of the body.

18. Apparatus in accordance with claim 16 having at least three non-central orifices.

19. Apparatus in accordance with claim 16 wherein the first end of the hollow tube extends through the central orifice and wherein the first end of said hollow tube is extended away from the end cap a distance ranging from 0 centimeter to about 5 centimeters.

20. Apparatus in accordance with claim 16 which has at least two orifices extending from the exterior surface of the body to the second chamber.

21. Apparatus in accordance with claim 1 wherein the main gas block is further comprised of a support portion and header, the support portion having at least two gas supply connections, a first gas supply connection adapted for accepting flow of the highly-carbon-laden gas, and a second gas supply connection adapted for accepting flow of the mixture of fuel and oxidant, the gas supply connections adapted to be connected to gas supply conduits, the first and second gas supply connections connected to respective conduits internal to said support portion and said header for supplying said gases to at the burner nozzles, said burner nozzles positioned in a hole in said header.

22. Apparatus in accordance with claim 21 wherein the support portion has a third gas supply connection, the third gas supply connection adapted to receive a flow of a purge gas, the third gas supply connection connected to respective conduits internal to said support portion and said header to supply purge gas to said burner nozzles.

23. Apparatus in accordance with claim 21 comprising a shield substantially surrounding a gas exit end of the burner nozzles.

24. Apparatus in accordance with claim 23 wherein said ignition source is positioned in a side of the shield.

25. Apparatus in accordance with claim 24 comprising a purge gas nozzle positioned on an under side of the header and protruding into a space created by the shield, the purge gas nozzle positioned to direct a flow of purge gas near said ignition source.

26. Apparatus in accordance with claim 21 comprising a removeable head assembly mounting plate comprising a T-tongued plate on a clamp block, wherein the T-tongued plate serves to position the head assembly on a clamp block.

27. Apparatus accordance with claim 26 wherein the head assembly mounting plate has off-setting bolt holes from a center line of the mounting plate.

28. Apparatus in accordance with claim 26 wherein the clamp block allows height adjustment on a shaft, the clamp block comprising a T-slot adapted to accept the head assembly mounting plate, and a rectangular slot adapted to receive an engaging nut, the clamp block comprising two halves secured together using matching clamp block clamp halves using a clamp block bolt and engagement nut, the clamp block having a clamp block shaft hole adapted to accommodate a shaft.

29. Apparatus in accordance with claim 14 wherein the automatic ignition system comprises the electronic controller and a spark producing means, the electronic controller adapted to initiate flow of fuel and oxidant gases, and said electronic controller adapted to cause an electrical signal to the spark producing means and ignite the pilot flame in said spark producing means at least one cycle before a firing cycle, and deactivate the flow of fuel and oxidant following a scheduled need for said pilot flame.

30. Apparatus in accordance with claim 2 wherein the burner nozzles are adapted to be removed and replaced by identical burner nozzles in less than 60 seconds.

31. Apparatus in accordance with claim 3 wherein the burner nozzles are adapted to be removed and replaced by a non-identical burner nozzles in less than 60 seconds.

32. An apparatus comprising:
   a) at least a first burner nozzle and a second burner nozzle,
   b) the burner nozzles including a first injector for injecting a highly-carbon-laden gas,
   c) the burner nozzles including at least one second injector for injecting a mixture of a fuel and an oxidant for a pilot flame,
   d) the burner nozzles secured in a moveable head assembly, the head assembly comprising a main gas block and an ignition source mounted in a gas plenum which encloses respective tips of the first and second injectors,
   e) the highly-carbon-laden gas and the fuel and oxidant mixture adapted to exit through these tips and enter and fill the gas plenum,
   f) one or more deflector jets installed at points substantially between first and second burner nozzles, the deflector jet adapted to direct a portion of said mixture of fuel gas and oxidant toward the ignition source, and
   g) wherein the ignition source comprises an electronic controller and a spark producing means, the electronic controller adapted to initiate flow of fuel and oxidant gases, and said electronic controller adapted to cause an electrical signal to the spark producing means and ignite the pilot flame in said spark producing means at least one cycle before a firing cycle, and deactivate the flow of fuel and oxidant following a scheduled need for said pilot flame.

* * * * *